US009933687B1

(12) United States Patent
Stephen

(10) Patent No.: US 9,933,687 B1
(45) Date of Patent: Apr. 3, 2018

(54) OPTIMIZED WAVELENGTH-TUNED NONLINEAR FREQUENCY CONVERSION USING A LIQUID CRYSTAL CLAD WAVEGUIDE

(71) Applicant: The United States of America as represented by the Administrator of the National Aeronautics and Space Administration, Washington, DC (US)

(72) Inventor: Mark A. Stephen, Catonsville, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 15/433,128

(22) Filed: Feb. 15, 2017

(51) Int. Cl.
*G02F 1/35* (2006.01)
*G02F 1/355* (2006.01)
*G02F 1/365* (2006.01)
*G02F 2/02* (2006.01)

(52) U.S. Cl.
CPC ............ *G02F 1/3544* (2013.01); *G02F 1/353* (2013.01); *G02F 1/3551* (2013.01); *G02F 1/3558* (2013.01); *G02F 1/365* (2013.01); *G02F 2001/3546* (2013.01)

(58) Field of Classification Search
CPC ...... G02F 1/353; G02F 1/3544; G02F 1/3551; G02F 1/3558; G02F 1/365; G02F 2001/3546
See application file for complete search history.

(56) References Cited

U.S. PATENT DOCUMENTS 6,459,533 B1 * 10/2002 Clapp .................... G02F 1/011
359/260

FOREIGN PATENT DOCUMENTS

WO     WO 0206886 A1 *   1/2002   .......... G02F 1/1326
WO     WO 2008098404 A2 *   8/2008   ............. C30B 29/30

OTHER PUBLICATIONS

T. R. Volk et al "Microdomain Patterns Recorded by an Electron Beam in He-Implanted Optical Waveguides on X-Cut LiNbO 3 Crystals," in Journal of Lightwave Technology, vol. 33, No. 23, pp. 4761-4766, Dec. 1, 1 2015.*

* cited by examiner

*Primary Examiner* — Rhonda Peace
(74) *Attorney, Agent, or Firm* — Christopher O. Edwards; Bryan A. Geurts; Mark P. Dvorscak

(57) ABSTRACT

An optimized wavelength-tuned nonlinear frequency conversion process using a liquid crystal clad waveguide. The process includes implanting ions on a top surface of a lithium niobate crystal to form an ion implanted lithium niobate layer. The process also includes utilizing a tunable refractive index of a liquid crystal to rapidly change an effective index of the lithium niobate crystal.

20 Claims, 2 Drawing Sheets

OPTIMIZED WAVELENGTH-TUNED NONLINEAR FREQUENCY CONVERSION USING A LIQUID CRYSTAL CLAD WAVEGUIDE

STATEMENT OF FEDERAL RIGHTS

The invention described herein was made by employees of the United States Government and may be manufactured and used by or for the Government for Government purposes without the payment of any royalties thereon or therefore.

FIELD

The present invention generally relates to waveguides, and more particularly, to improvements in wavelength conversion efficiency.

BACKGROUND

There are numerous applications that require wavelength-tunable laser sources. These include differential optical absorption spectroscopy instruments for methane, carbon dioxide, water vapor, oxygen, etc., and various in-situ spectrometers. Nonlinear frequency conversion enables laser sources to reach wavelengths not directly accessible through other means but can make wavelength tuning more difficult. Other wavelength tuning methods in nonlinear frequency conversion are slow (temperature), complicated (multiple crystals or complex mechanical tuning) or inefficient (chirped gratings or non-optimized phase matching conditions).

Thus, an alternative approach that eliminates these issues and yields high-efficiency, fast, tunable nonlinear wavelength conversion may be beneficial.

SUMMARY

Certain embodiments of the present invention may provide solutions to the problems and needs in the art that have not yet been fully identified, appreciated, or solved by conventional waveguides. For example, some embodiments of the present invention pertain to frequency doubling where light of one wavelength is converted to light with half the initial wavelength.

In an embodiment, a process for quickly changing the phase-matching conditions over a broad range of wavelengths using liquid crystals (e.g., as the cladding layer) in a waveguide. The process includes implanting ions on a top surface of a lithium niobate crystal (or nonlinear material) to form an ion implanted lithium niobate layer. The process also includes utilizing a tunable refractive index of a liquid crystal to rapidly change an effective index of the lithium niobate crystal waveguide.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention generally pertain to a nonlinear optical material waveguide for significantly improving the wavelength conversion efficiency. This may apply for wavelengths from the ultra-violet through the Mid-infrared (IR).

Efficient nonlinear optical conversion may require a precise phase-matching condition. Due to optical dispersion (i.e., light having a different index of refraction for different wavelengths), the phase-matching condition is maintained over a narrow wavelength band. Generally, temperature-tuning or angle-tuning of the nonlinear crystal is conducted to maintain phase-matching during wavelength-tuning. Liquid crystals (LCs) have a widely tunable refractive index that changes with voltage. Some embodiments exploit this LC property to counteract optical dispersion, and thus, extend the range over which light can be efficiently converted.

Figure 1:
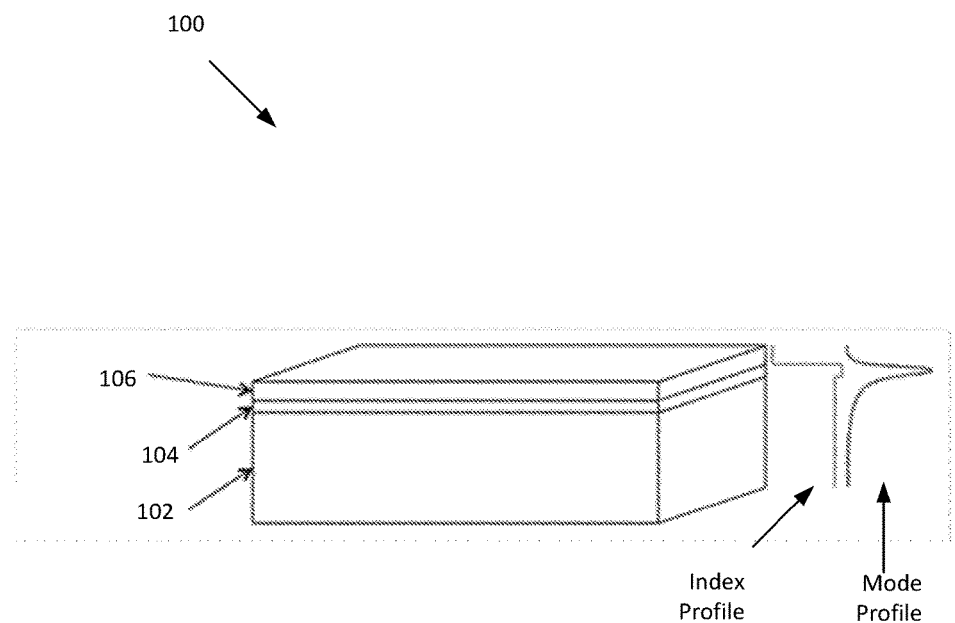
FIG. 1 is a diagram illustrating a lithium niobate planar waveguide, according to an embodiment of the present invention.

FIG. 1 is a diagram illustrating a lithium niobate planar waveguide ("waveguide") 100, according to an embodiment of the present invention. Waveguide 100 uses lithium niobate (e.g., a periodically-poled lithium niobate (PPLN)) 102 as a nonlinear crystal (or material) in a planar waveguide configuration. Lithium niobate ($LiNbO_3$) 102 is transparent from the ultra-violet to the Mid-IR, and has a high nonlinear coefficient. The strong confinement in waveguide 100 allows for higher intensities and efficient nonlinear conversion, even at low power levels.

A fundamental requirement for efficient nonlinear wavelength conversion is phase-matching the pump wavelength and the signal wavelength, as the pump wavelength and the signal wavelength travel through lithium niobate 102. Signal created at all points in lithium niobate 102 should have the same relative phase to the pump or it will interfere destructively. Various methods may be employed including types of crystals, crystal cut, temperature-tuning, alignment, periodic poling, and the use of different axes of birefringent crystals. Unfortunately, due to dispersion (dielectric materials have a wavelength-dependent index of refraction), this phase-matching condition occurs for only a very narrow wavelength band.

To resolve this issue, some embodiments utilize a tunable refractive index of LCs 106 to rapidly change the effective index of lithium niobate 102. For example, some embodiments use the liquid crystal 106 to tune the phase matching characteristics, e.g., the ability to tune the phase matching more quickly using the liquid crystal layers. For example, significant liquid crystal index of refraction changes may occur in fractions of a millisecond (<100 microseconds) compared to bulk temperature changes, which would generally take multiple seconds for a nonlinear crystal, thus making orders of magnitude improvement in speed.

To begin, ions are implanted on the top surface of lithium niobate 102 to form an ion implanted lithium niobate layer 104. The implantation of the ions increase the density of the material. This results in an increase of the optical index (or index profile).

Next, voltage is applied to LC 106, significantly changing the index of refraction. As shown in FIG. 1, the tail of mode profile leaks into LC 106 (called evanescent wave). By changing the index of refraction of LC 106, the effective index of waveguide 100 is changed. Thus, by changing the voltage across LC 106, the optical index (or index profile) of waveguide 100 is changed. This means that the speed of light changes as it travels through waveguide 100. This also means that the phase characteristics of waveguide 100 are tuned, resulting in a change of the phase condition inside waveguide 100.

In some embodiments, a person of ordinary skill in the art would appreciate that there are other ways to increase the index other than ion implantation to form a waveguide. This may include physical contact of dissimilar materials, growth techniques, etc. Other materials with highly tunable indexes of refraction are available such as graphene. In addition, index-tuning technology may be used to steer a laser beam. For example, using a scanner to angle-tune the phase-matching condition could achieve the same basic results in a non-mechanical beam-steerer.

Figure 2:
FIG. 2 is a graph illustrating speed of a liquid crystal waveguide switch, according to an embodiment of the present invention.
Figure 2:
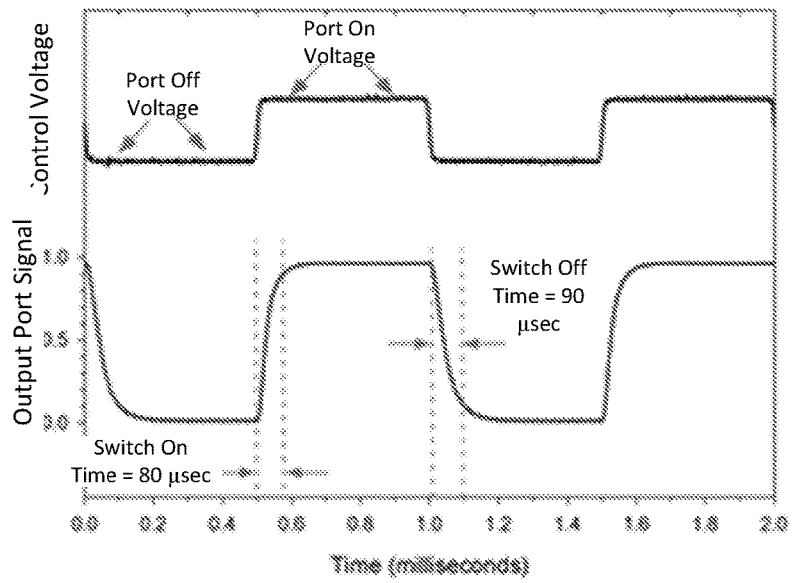

FIG. 2 is a graph 200 illustrating speed of a liquid crystal waveguide switch, according to an embodiment of the present invention. In this embodiment, graph 200 shows that transition times are less than 100 microseconds enabling wavelength switching at a rate of 10 KHz. The speed is improved from traditional LC devices because the evanescent wave only interacts with the high-speed surface layer of the LC cladding. The LC-clad $LiNbO_3$ device of FIG. 1, for example, may be even faster since the wave function is more surface selective.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An optimized wavelength-tuned nonlinear frequency conversion process using a liquid crystal waveguide, comprising:
   implanting ions on a top surface of a nonlinear material to form an ion implanted layer; and
   utilizing a tunable refractive index of a liquid crystal to rapidly change an effective index of the nonlinear material.

2. The process of claim 1, wherein the liquid crystal is on top of the ion implanted layer of the nonlinear material.

3. The process of claim 1, wherein the utilizing of the tunable refractive index of a liquid crystal comprises using the liquid crystal to tune phase matching characteristics of the waveguide.

4. The process of claim 3, wherein the widely tunable refractive index of the liquid crystal change with voltage.

5. The process of claim 4, wherein the utilizing of the tunable refractive index further comprising applying a voltage to the liquid crystal to change an index of refraction, extending range over which light can be converted.

6. The process of claim 1, wherein the nonlinear material comprises lithium niobate crystal.

7. The process of claim 1, wherein the nonlinear material further comprises a periodically poled lithium niobate crystal.

8. The process of claim 6, wherein the lithium niobate crystal is transparent from ultra-violet to Mid-IR, and comprises a high nonlinear coefficient.

9. A process for manufacturing a planar waveguide comprising nonlinear material, comprising:
   utilizing liquid crystals to tune phase matching characteristics of nonlinear material, wherein the utilizing of the liquid crystals comprises
   utilizing a tunable refractive index of the liquid crystals to rapidly change effective index of the nonlinear material.

10. The process of claim 9, wherein the nonlinear material comprises a periodically-poled lithium niobate crystal.

11. The process of claim 9, further comprising:
   implanting ions on a top surface of the nonlinear material to form an ion implanted layer.

12. The process of claim 11, wherein the implanted ions increase density of the nonlinear material, resulting in an increase of an index profile.

13. The process of claim 11, further comprising:
applying a voltage to the liquid crystals to significantly change the index of refraction.

14. The process of claim 13, wherein the liquid crystals are on top of the ion implanted layer.

15. A nonlinear planar waveguide, comprising:
nonlinear material configured to frequency doubling where light of a first wavelength is converted to a light with half of the first wavelength;
an ion implanted layer configured to increase density of the nonlinear material; and
a liquid crystal configured to tune phase matching characteristics of the nonlinear material.

16. The nonlinear planar waveguide of claim 15, wherein the nonlinear material comprises periodically poled lithium niobate.

17. The nonlinear planar waveguide of claim 15, wherein the ion implanted layer is on top of the nonlinear material to increase an optical index or index profile of the nonlinear material.

18. The nonlinear planar waveguide of claim 15, wherein the liquid crystal is on top of the ion implanted layer for tuning of the phase matching characteristics.

19. The nonlinear planar waveguide of claim 18, wherein a voltage is applied to the liquid crystal to change the index of refraction.

20. The nonlinear planar waveguide of claim 19, wherein the applied voltage to the liquid crystal changes an optical index or index profile of the waveguide, resulting in a change of phase condition inside the waveguide.

* * * * *